June 13, 1939.   E. L. CLARK   2,162,157
BATON
Filed Oct. 12, 1938
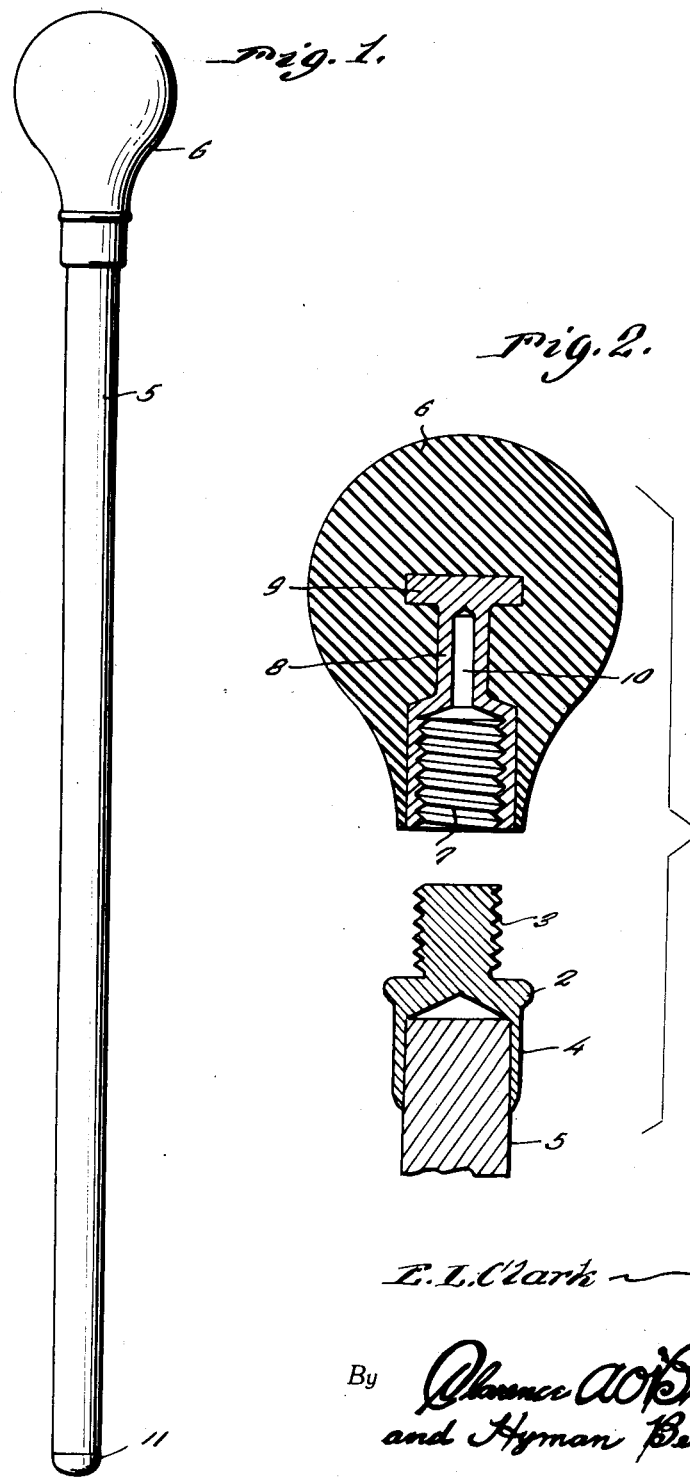
Inventor
E. L. Clark Patented June. 13, 1939

2,162,157

UNITED STATES PATENT OFFICE 2,162,157

BATON

Edward L. Clark, Elkhart, Ind.

Application October 12, 1938, Serial No. 234,725

3 Claims. (Cl. 84—477)

The present invention relates to drum majors' batons and has for its primary object to provide a rubber head or knob removably secured to one end of the baton.

A further object is to provide an internally threaded connector imbedded in the rubber head for threadedly securing the same to the end of the baton, said connector including a chamber adapted to accommodate a weight to adjust the balance of the baton, when desired.

A still further object is to provide a device of this character of simple and practical construction, which is neat and attractive in appearance, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1 is a side elevational view of the baton with the head shown in position thereon, and Figure 2 is a longitudinal sectional view through the head and upper end of the baton.

Referring now to the drawing in detail, the numeral 5 designates a baton of conventional construction having a sleeve 4 snugly fitted on the baton and provided with a reduced threaded stem 3 for threaded engagement by an internally threaded connector 7 which is molded or otherwise imbedded in the rubber head 6, said connector including a hollow stem 8 having a head 9 cast thereon and preferably positioned substantially in the center of the head 6. The connector 7 is preferably formed of brass or other metal.

A bead 2 is also formed at the junction of the sleeve and stem 3 to protect the edge of the rubber head 6 where it joins the sleeve.

The stem 8 is of hollow construction to provide a chamber 10 communicating with the threaded bore on the connector as will be apparent from an inspection of Figure 2 of the drawing. When desired, a weight (not shown) may be inserted in the chamber 10, either in the form of melted lead dropped therein or by removably positioning a weighted object therein, for the purpose of increasing the weight of the head to properly balance the baton.

The opposite end of the baton is provided with a rubber tip 11.

It will be understood that the rubber head 6 may be of any suitable color and by reason of its detachability, heads of various colors may be interchangeably used, as desired.

It is believed that the details of construction and manner of use of the device will be readily understood from the foregoing without further detailed explanation.

Having thus described the invention, what I claim is:

1. A rubber head for batons having an internally threaded connector imbedded therein for detachably connecting the head to the baton and a chamber formed in the connector adapted to receive a weight to increase the weight of the head.

2. In a baton, a rubber head, an internally threaded connector imbedded in the head and adapted for detachably connecting the head to one end of the baton, said connector including a hollow stem providing a chamber adapted to have a weight placed therein.

3. In a baton, a shaft, a sleeve fitted on the upper end thereof and provided with a threaded stem, a bead at the junction of the stem with the sleeve, and a rubber head having an internally threaded metallic connector imbedded therein for attaching to the stem, said head, at its connected end, being protected by said bead.

EDWARD L. CLARK.